(12) United States Patent
Oomura et al.

(10) Patent No.: US 7,398,653 B2
(45) Date of Patent: Jul. 15, 2008

(54) AIR CONDITIONER FOR VEHICLE CAPABLE OF PREVENTING INVERTER OVERHEATING

(75) Inventors: Mitsuyo Oomura, Hekinan (JP); Toshinobu Homan, Oobu (JP)

(73) Assignee: Denso Corporation, Kariya (JP)

( * ) Notice: Subject to any disclaimer, the term of this patent is extended or adjusted under 35 U.S.C. 154(b) by 472 days.

(21) Appl. No.: 11/086,217

(22) Filed: Mar. 22, 2005

(65) Prior Publication Data

US 2005/0210900 A1    Sep. 29, 2005

(30) Foreign Application Priority Data

Mar. 24, 2004    (JP)    ............................ 2004-086807

(51) Int. Cl.
| F25B 45/00 | (2006.01) |
| F25B 1/00  | (2006.01) |
| F25B 49/00 | (2006.01) |

(52) U.S. Cl. .................. 62/228.4; 62/228.1; 62/230
(58) Field of Classification Search ............... 62/228.1, 62/230, 228.3, 228.4
See application file for complete search history.

(56) References Cited

U.S. PATENT DOCUMENTS

| 5,243,827 | A | * | 9/1993 | Hagita et al. ................ 62/113 |
| 5,829,264 | A |   | 11/1998 | Ishigaki et al. |
| 6,892,550 | B2 |   | 5/2005 | Takemoto et al. |
| 7,165,411 | B2 | * | 1/2007 | Eisenhour ................ 62/228.3 |
| 2002/0129615 | A1 | * | 9/2002 | Ma et al. ................ 62/324.1 |
| 2002/0157414 | A1 | * | 10/2002 | Iwanami et al. ............. 62/239 |
| 2004/0107715 | A1 | * | 6/2004 | Lee et al. ................ 62/223 |
| 2005/0183434 | A1 | * | 8/2005 | Iritani et al. ............. 62/228.1 |
| 2006/0090490 | A1 | * | 5/2006 | Grimm et al. ............. 62/181 |

FOREIGN PATENT DOCUMENTS

| CN | 1477354 | 2/2004 |
| JP | 62-080115 | 4/1987 |
| JP | 09-145174 | 6/1997 |
| JP | 2003-139069 | 5/2003 |
| JP | 2003139069 A | * | 5/2003 |
| JP | 2004-069138 | 3/2004 |

OTHER PUBLICATIONS

Office Action dated Aug. 27, 2007 from corresponding JP Application No. 2004-086807 with English translation.
Office Action dated Apr. 23, 2007 in Chinese Application No. 2005-100590175 with English translation.

* cited by examiner

*Primary Examiner*—Chen-Wen Jiang
(74) *Attorney, Agent, or Firm*—Harness, Dickey & Pierce, PLC

(57) ABSTRACT

An inverter 6 that drives an electric motor 4 of the electric compressor 3 operates in a protection-against-overheat mode, in which the electric motor is driven at a rotational speed for protection against heat different from a rotational speed specifying value from an air conditioning control unit 20, in order to ensure the flow rate of the refrigerant and cool the inverter itself when the temperature detected by an inverter temperature sensor 22g exceeds a predetermined value. At this time, if the refrigerant pressure increases or the evaporator discharge temperature falls, the air conditioning control unit stops the protection-against-overheat mode operation of the inverter and directs the inverter to forcedly stop the electric motor. Due to this, an excessive increase in the refrigerant pressure and evaporator freezing can be prevented, and thus the function of the refrigerating cycle can be protected.

6 Claims, 11 Drawing Sheets

Fig.4
(a) 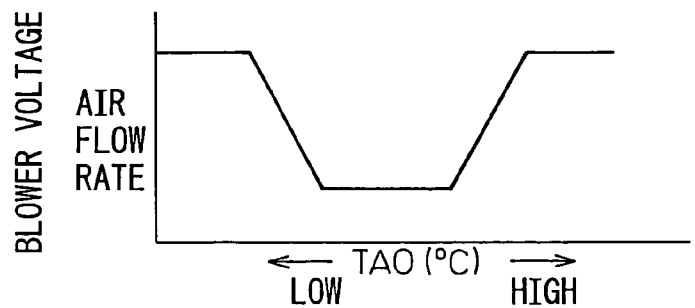
(b) 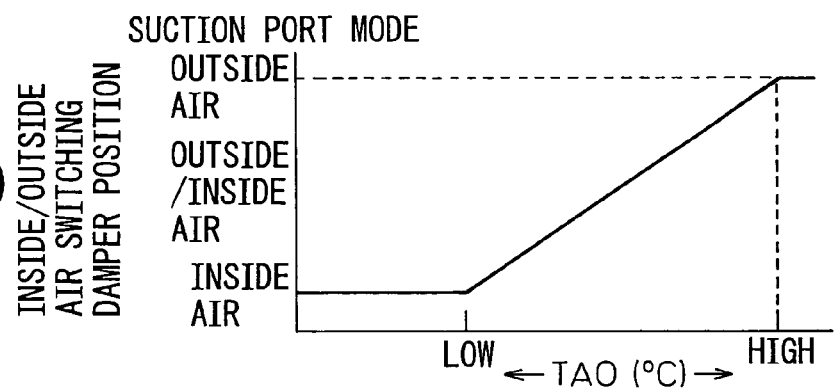
(c) 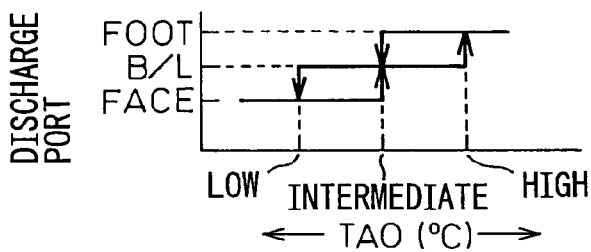
(d) 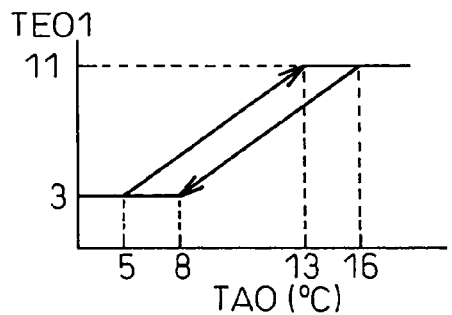
(e) 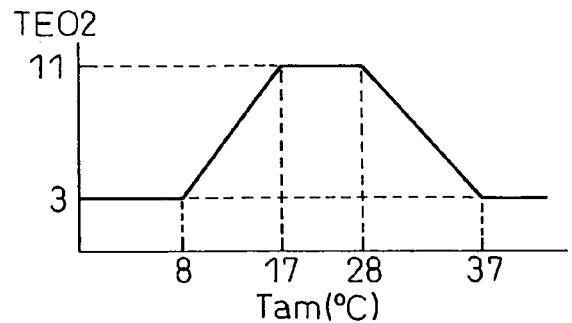

AIR CONDITIONER FOR VEHICLE CAPABLE OF PREVENTING INVERTER OVERHEATING

BACKGROUND OF THE INVENTION

Field of the Invention

The present invention relates to an air conditioner for a vehicle having the protective function for protecting a cooling system thereof using an electric compressor.

According to a prior art, a well-known air conditioner for a vehicle, in which an electric compressor having a compressor that sucks and discharges a refrigerant, a compression section that compresses the refrigerant sucked into the compressor, an electric motor that drives the compression section, and a motor drive unit that drives and controls the electric motor, is used in a refrigerating cycle having a condenser, a pressure reducing device, and an evaporator, etc.

In such an air conditioner for a vehicle, the motor drive unit that drives and controls the electric compressor increases in temperature because of the heat produced by the operation of the motor drive unit itself and the heat discharged from other heat sources such as an engine, and there arises the possibility that the motor drive unit comprising a semiconductor device may not operate normally. Measures against this include one in which the motor drive unit is arranged at a position at which heat exchange can be effected with the refrigerant at the suction side of the electric compressor, and when the temperature of the motor drive unit exceeds a predetermined value, the rotational speed of the electric motor is increased to increase the flow rate of refrigerant sucked into the electric compressor, and thus the motor drive unit is cooled and protected from heat (for example, refer to Patent document 1).

[Patent Document 1]
Japanese Unexamined Patent Publication (Kokai) No. 2003-139063

However, in the above-mentioned prior art, protection against heat in the motor drive unit is not taken into account in a state in which the electric motor of the electric compressor is at rest, that is, when the refrigerant is not flowing.

Moreover, if the refrigerant is forcedly made to flow in the refrigerating cycle, for the protection of the motor drive unit against heat, by increasing the rotational speed of the electric motor in a state in which the electric motor is at rest or the cooling heat load is small, that is, when heat exchange is hardly effected in the condenser and in the evaporator in the refrigerating cycle, the following problem arises.

That is, if an attempt is made to supply a refrigerant under high pressure to a condenser that hardly effects heat exchange, as the flow rate of the refrigerant does not increase sufficiently in the condenser, the pressure at the side of the refrigerant inlet of the condenser increases and in accordance with this, the torque of the electric motor also increase. Because of this, the current of the electric motor also increases and, therefore, the temperature inside the motor drive unit is raised and the cooling effect by the refrigerant in the motor drive unit can be no longer obtained. Moreover, if an attempt is made to supply a refrigerant under high pressure to the condenser, there is the possibility that the pressure at the side of the refrigerant inlet of the condenser increases excessively, the refrigerant flow path is damaged by the pressure, and the refrigerating cycle no longer functions.

Moreover, as the amount of exchanged heat is small in the evaporator, the flow rate of the refrigerant to the evaporator increases, cooling the evaporator excessively, and condensed water is frozen and, therefore, there is the possibility that the refrigerating cycle no longer functions.

SUMMARY OF THE INVENTION

The above-problems being taken into account, the object of the present invention is to protect a refrigerating cycle when a refrigerant is made to flow forcedly in the refrigerating cycle in order to protect a motor drive unit, of an electric compressor, against heat.

In order to attain the above mentioned object, an air conditioner for a vehicle in a first aspect of the present invention comprises: an electric compressor (3) having a compression mechanism (5) that sucks and compresses a refrigerant, an electric motor (4) that drives the compression mechanism, and a motor drive unit (6) that controls and drives the electric motor and is arranged so as to be cooled by the refrigerant; and an air conditioning control unit (20) that issues a rotational speed specifying value, that specifies a rotational speed of the electric motor or directs the electric motor to stop, to the motor drive unit. In the air conditioner, the electric motor operates in a protection-against-overheat mode in which the motor drive unit is cooled by the refrigerant supplied in a state in which the electric motor rotates at a rotational speed for protection against heat specified separately from the rotational speed specifying value to suck and compress the refrigerant, when the motor drive unit is in a state of overheat, and the air conditioning control unit judges whether the protection-against-overheat mode should be stopped during the operation in the protection-against-overheat mode and when the result of the judgment is that the mode should be stopped, the air conditioning control unit outputs a stop signal to the motor drive unit to stop the rotation of the electric motor rotating at the rotational speed for protection against heat.

According to the present invention, when the motor drive unit, in a state of overheat thereof, operates in the protection-against-overheat mode to cool itself by the refrigerant by rotating the electric motor at the rotational speed for protection against heat to suck and compress the refrigerant, the air conditioning control unit judges whether the protection-against-overheat mode should be stopped after making sure that the motor drive unit is operating in the protection-against-overheat mode and, when the result of the judgment is that the mode should be stopped, the air conditioning control unit issues the stop signal to the motor drive unit to stop the rotation of the electric motor. Due to this, the electric motor can be forcedly stopped only when the motor drive unit continues the operation in the protection-against-overheat mode and it is judged that the protection-against-overheat mode should be stopped. In other words, as the electric motor is not stopped forcedly while the electric motor is in normal operation or the operation in the protection-against-overheat mode is judged to be necessary, it is possible to prevent a state in which the function of the refrigerating cycle is lost, and which would be caused if the protection-against-overheat mode continues and, thus, the refrigerating cycle can be protected.

In an air conditioning control unit according to a second aspect of the present invention, the motor drive unit can drive the electric motor in accordance with the rotational speed specifying value from the air conditioning control unit or can operate in the protection-against-overheat mode regardless of the rotational speed specifying value by outputting a start signal to the motor drive unit when a stop signal is not output, that is, when the operation in the protection-against-overheat mode is not judged to be stopped.

In a third aspect of the present invention, a state of overheat of the motor drive unit can be judged based on the temperature of the motor drive unit detected by a drive unit temperature detection means (22g).

In a fourth aspect of the present invention, the motor drive unit judges whether to operate in the protection-against-overheat mode and, when the result of the judgment is to do so, the motor drive unit transmits a protection-against-overheat mode flag to the air conditioning control unit as well as driving the electric motor at the rotational speed for protection against heat regardless of the rotational speed specifying value from the air conditioning control unit, and the air conditioning control unit judges whether the protection-against-overheat mode should be stopped when the protection-against-overheat mode flag is transmitted.

Due to this, as it is possible for the motor drive unit to operate in the protection-against-overheat mode after judging by itself whether to operate in the protection-against-overheat mode, the protection against overheat can be surely carried out with a simple system not depending on other control units, and the air conditioning control unit, which is one of the other control units, can easily judge the operation state of the motor drive unit based on the protection-against-overheat mode flag from the motor drive unit.

As in a fifth aspect of the present invention, the judgment whether the motor drive unit is in operation in the protection-against-overheat mode in the air conditioning control unit may be made directly based on the temperature detected by the drive unit temperature detection means.

As in a sixth aspect of the present invention, the protection-against-overheat mode can be carried out when the motor drive unit enters the state of overheating with the electric compressor at rest.

Due to this, even when the electric compressor is at rest such as when the rotational speed specifying value from the air conditioning control unit is zero (a stop directive) because an air conditioning heat load is extremely small or the like or when an air conditioner switch is turned off by the manual operation of a passenger, the motor drive unit may enter a state of overheat caused by the influence of the circumstance in which the motor drive unit is arranged (in an engine compartment, etc.). Therefore, in this case also, the motor drive unit can be cooled, without fail, by operating in the protection-against-overheat mode.

As in a seventh aspect of the present invention, in the protection-against-overheat mode and when the electric compressor is at rest, it is possible to set in advance the rotational speed, for protection against heat of the electric motor for cooling, as a fixed value.

As in an eight aspect of the present invention, in the protection-against-overheat mode and when the electric compressor is in operation in accordance with the rotational speed specifying value from the air conditioning control unit, it is possible to cool the motor drive unit by setting the rotational speed for protection against heat to a rotational speed higher than the rotational speed specifying value by a predetermined amount.

In a ninth aspect of the present invention, the air conditioner for a vehicle comprises a pressure detection means (22f) that detects the pressure of the refrigerant and the air conditioning control unit judges that the protection-against-overheat mode should be stopped when the detected refrigerant pressure exceeds a predetermined value.

Due to this, while the electric compressor is sucking and compressing the refrigerant in the protection-against-overheat mode in order to cool the motor drive unit, it is possible to prevent the refrigerant pressure from increasing by stopping the protection-against-overheat mode, that is, by forcedly stopping the electric motor when the refrigerant pressure in the refrigerating cycle increases not less than the predetermined value and exceeds the allowable pressure in the refrigerant flow path, and thus the refrigerating cycle system can be prevented from being damaged and the function thereof from being lost.

In a tenth aspect of the present invention, the air conditioner for a vehicle comprises an evaporator (11) that evaporates the refrigerant and an evaporator discharge temperature detection means (22e) that detects the temperature of the air having passed through the evaporator, and the air conditioning control unit judges that the protection-against-overheat mode should be stopped when the temperature detected by the evaporator discharge temperature detection means falls below the predetermined value.

Due to this, while the electric compressor is sucking and compressing the refrigerant in the protection-against-overheat mode in order to cool the motor drive unit, it is possible to prevent the temperature of the evaporator from falling by stopping the protection-against-overheat mode, that is, by forcedly stopping the electric motor so that the flow rate of the refrigerant is zero when the temperature of the air having passed through the evaporator falls not more than a predetermined value in the evaporator in the refrigerating cycle and there is the possibility that the surface of the evaporator enters a state of frosting and, thus, the evaporator can be prevented from entering the state of frosting and the function of the refrigerating cycle system from being lost.

The symbols in the parenthesis attached to each means described above indicate a correspondence with a specific means in the embodiments to be described later.

The present invention may be more fully understood from the description of the preferred embodiments of the invention set forth below, together with the accompanying drawings.

BRIEF DESCRIPTION OF THE DRAWINGS

In the drawings:

FIG. 4(a) to FIG. 4(e) are operation characteristic diagrams of an air conditioning control in the embodiments.

DESCRIPTION OF THE PREFERRED EMBODIMENTS

First Embodiment

Figure 1:
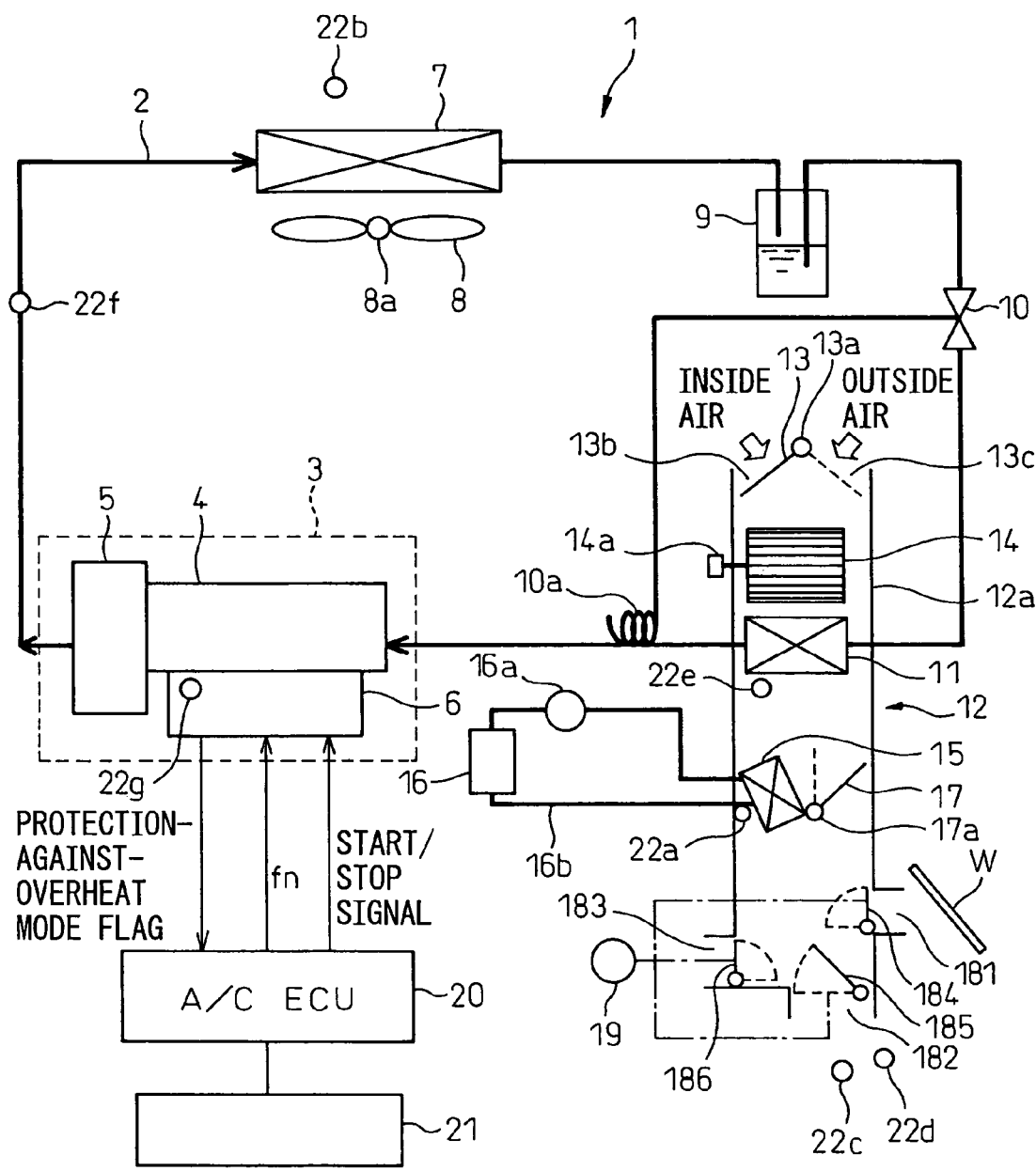
FIG. 1 is a diagram showing the general configuration of an air conditioner for a vehicle in an embodiment of the present invention.

FIG. 1 is a diagram showing the general configuration of an air conditioner for a vehicle 1 in the present embodiment. An refrigerating cycle 2 of the air conditioner for a vehicle 1 comprises an electric compressor 3 that sucks, compresses and discharges a refrigerant. The electric compressor 3 comprises an electric motor 4 and a compression mechanism 5 driven by the electric motor 4, both being formed integrally into one unit. Specifically, the electric motor 4 is a three-phase AC motor and the compression mechanism 5 is, for example, a well-known compression mechanism of scroll type. Due to this, the compression mechanism 5 can change the discharge displacement continuously in the range between 0% and 100% in accordance with the rotational speed of the electric motor 4.

By variably controlling the frequency of a three-phase AC power supply provided to the electric motor 4 by means of an inverter 6 as a motor drive unit, it is possible to control the rotational speed of the electric motor 4 to a rotational speed specifying value, which is a control output of an air conditioning control unit (A/C ECU) 20 to be described later, and to increase or decrease the flow rate of discharged refrigerant of the electric compressor 3 in accordance with the magnitude of the rotational speed of the electric motor 4.

The overheated gas refrigerant under high temperature and high pressure conditions discharged from the electric compressor 3 flows into a condenser 7, effects heat exchange with the outside air supplied by an electric fan 8, and is cooled and condensed. The refrigerant condensed in the condenser 7 flows into a receiver 9, the gas and liquid of the refrigerant are separated in the receiver 9, and the excessive refrigerant (liquid refrigerant) in the refrigerating cycle 2 is stored in the a receiver 9. A pressure sensor 22$f$ is provided in the refrigerant pipeline between the electric compressor 3 and the condenser 7 to detect the refrigerant pressure at the high-pressure side in the refrigerating cycle 2.

The liquid refrigerant from the receiver 9 is reduced in pressure by an expansion valve 10 (pressure reducing means) 10 and brought into a mixed gas-liquid phase (two phase) under low pressure. The expansion valve 10 is of a temperature type having a temperature sensor 10$a$ that detects the temperature of the refrigerant at the outlet of an evaporator 11. The low-pressure refrigerant from the expansion valve 10 flows into the evaporator (heat exchanger for cooling) 11. The evaporator 11 is arranged in an air conditioning case 12$a$ in an air conditioning unit 12 of the air conditioner for a vehicle 1 and the low-pressure refrigerant having flowed into the evaporator 11 absorbs heat from the air in the air conditioning case 12$a$ and evaporates. The outlet of the evaporator 11 is connected to the suction side of the electric compressor 3 and the above-mentioned cycle component parts constitute a closed circuit.

The electric compressor 3 is arranged in an engine compartment, not shown. The inverter 6 as a motor drive unit for driving the electric motor 4 is integrally installed on the housing of the electric motor 4 in an example of FIG. 1.

Therefore, the inverter 6 is exposed to heat discharged from the engine, which is a heat source 16, the exhaust manifold, the condenser 7, the electric fan 8, etc., in the engine compartment and at least the temperature of the casing of the inverter 6 reaches temperature higher than 100° C. even during the period of normal vehicle operation. Because of this it is necessary to improve the reliability of the inverter (the motor drive unit) 6 by reducing the temperature of each circuit element of the inverter 6 to a temperature at which a normal operation of the circuit element can be carried out.

In the present embodiment, therefore, the arrangement is such that the refrigerant having flowed out of the evaporator 11 and been sucked into the electric motor 4 of the electric compressor 3 first cools the electric motor 4 and the inverter 6, and then is sucked and compressed by the compression mechanism 5 and discharged to the condenser 7. The inverter 6 is provided with an inverter temperature sensor 22$g$ as a drive unit temperature detection means that detects a temperature TIN of the inverter circuit board. As will be described later, the inverter 6 drives the electric motor 4 at a predetermined protection-against-heat rotational speed (fixed value or rotational speed specifying value+predetermined value α) for cooling the inverter 6 instead of the rotational speed, that is, the rotational speed specifying value (target rotational speed) itself from the air conditioning control unit 20 when the inverter temperature TIN exceeds a predetermined temperature.

Instead of the electric compressor 3, which is of an inverter-integrated type as described above, a separate inverter type may be arranged, that is, the inverter 6 may be arranged separate from the electric motor 4 integrally joined to the compression mechanism 5. In this case, the cooling effect of the refrigerant can be obtained by arranging the inverter 6 at a portion at which heat exchange between the inverter 6 and the refrigerant pipeline at the refrigerant suction section of the electric motor 4 can be effected.

The air conditioner for a vehicle 1 comprises an air conditioning unit 12. The air conditioner unit 12 has a case 12$a$ and an air passage is formed therein through which air is supplied toward the vehicle compartment. At the uppermost end of the air passage in the case 12$a$, an inside/outside air switching damper 13 is rotatably arranged as an inside/outside air switching box.

The inside/outside air switching damper 13 is driven by a servo motor 13$a$ and switches between an inside air introduction mode for introducing the inside air (the air inside the vehicle compartment) through an inside air introduction inlet 13$b$ and an outside air introduction mode for introducing the outside air (the air outside the vehicle compartment) through an outside air introduction inlet 13$c$.

At the downstream side of the inside/outside air switching damper 13, an electric interior blower 14 for vehicle compartment use that generates a current of air toward the inside of the vehicle compartment is arranged. The interior blower 14 has a configuration in which a centrifugal fan is driven by a blower motor 14$a$.

At the downstream side of the interior blower 14, the evaporator 11 for cooling the air flowing through the case 12$a$ is arranged and, at the downstream side of the evaporator 11, a heater core 15 for heating the air flowing through the case 12$a$ is arranged. To the heater core 15, hot water (engine cooling water) of the vehicle engine, which is the heat source 16 circulating through a hot water circuit 16$b$ by a hot water pomp 16$a$, is supplied. In other words, the heater core 15 is a heat exchanger for heating that heats the air (cool air) having passed through the evaporator 11.

At the downstream side of the evaporator 11, an evaporator discharge temperature sensor 22$e$ that detects an evaporator discharge temperature Te, which is the discharge temperature of the evaporator 11, is provided, and the hot water circuit 16$b$ is provided with a water temperature sensor 22$a$ that detects a hot water (engine cooling water) temperature Tw in the hot water circuit 16$b$.

Between the evaporator 11 and the heater core 15, an air mix (A/M) damper 17 is rotatably arranged. The air mix damper 17 is driven by a servo motor 17a and the position of rotation (opening (degree)) is continuously adjustable. By the opening (degree) of the air mix (A/M) damper 17, the flow rate of the air (the flow rate of the hot air) passing through the heater core 15 and the flow rate of the air (the flow rate of the cool water) having passed through the bypass passage at the side of the heater core 15 and bypassing the heater core 15 are adjusted, and thus the temperature of the air discharged into the vehicle compartment can be adjusted.

At the lowermost end of the air passage in the air conditioning case 12, three kinds of discharge outlet are provided, that is, a defroster discharge outlet 181 for discharging conditioned air toward a front windshield W of the vehicle, a front seat side face discharge outlet 182 for discharging conditioned air toward the face of a passenger in the front seat, and a front seat side foot discharge outlet 183 for discharging conditioned air toward the feet of a passenger in the front seat.

At the upstream side of the discharge outlets 181 to 183, a defroster door 184, a front seat face door 185, and a front seat foot door 186 are rotatably arranged. The doors 184 to 186 are opened/closed by a common servo motor 19 via a link mechanism, not shown.

Other sensors provided include an outside air temperature sensor 22b for detecting an air temperature (outside air temperature) Tam outside the vehicle compartment, an inside air temperature sensor 22c for detecting an air temperature (inside air temperature) Tr inside the vehicle compartment, and a solar radiation sensor 22d for detecting a quantity of solar radiation Ts entering into the vehicle compartment.

Figure 2:
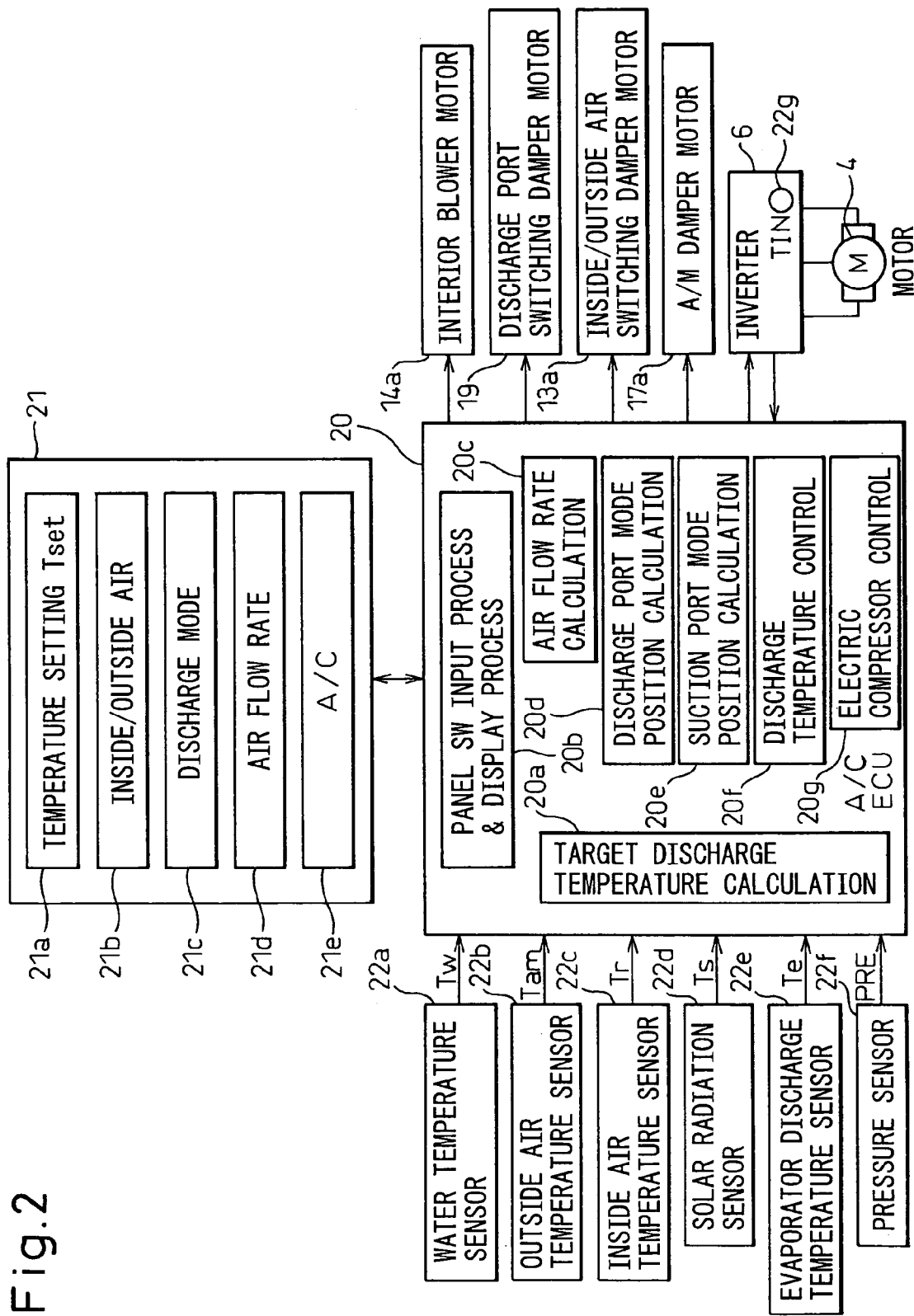
FIG. 2 is a block diagram showing an outline of an electric control section in embodiments.

Next, the outline of the electric control section in the present embodiment is explained with reference to FIG. 2. The air conditioning control unit (A/C ECU) 20 comprises a well-known microcomputer including CPU, ROM, RAM, etc., and peripheral circuits. The air conditioning control unit 20 stores control programs for air conditioning control in the ROM and various calculations and processes are carried out based on the control programs. In the block diagram in FIG. 2, typical function realizing means for control processes executed by the air conditioning control unit 20 are shown in respective blocks denoted by symbols 20a to 20g.

To the input side of the air conditioning control unit 20, sensor detection signals from the sensor group 22a to 22f and operation signals from an air conditioning operation panel 21 are inputted.

The air conditioning operation panel 21 is arranged in the vicinity of the instrument panel (not shown) in front of a driver's seat in a vehicle compartment and comprises operation switches 21a to 21e to be operated by a passenger and a display unit (not shown) for displaying the operation state of air conditioning as follows. The temperature setting switch 21a sends out a signal for a set temperature Tset in a vehicle compartment and the inside/outside air switching switch 21b sends out a signal for manually setting the inside air mode and the outside air mode by using the inside/outside air switching door (damper) 13.

The discharge mode switch 21c sends out a signal for manually setting a face mode, bilevel mode, foot mode, foot defroster mode, and defroster mode, widely known as discharge modes. The air-flow-rate switching switch 21d sends out a signal for manually turning on/off the interior blower 14 and manually switching the air flow rates.

The air conditioning switch 21e switches between the state of operation and the state of rest of the electric compressor 3 and when the air conditioning switch 21e is turned on, the air conditioning control unit 20 outputs a rotational speed specifying value in accordance with the target rotational speed fn calculated by the electric compressor control section 20g to the inverter 6 and, thereby, the electric motor 4 is driven in accordance with the rotational speed specifying value and the electric compressor 3 enters the state of operation. When the air conditioning switch 21e is turned off, the air conditioning control unit 20 outputs zero (the target rotational speed fn=0) as a rotational speed specifying value from the electric compressor control section 20g to the inverter 6 and thereby, the rotation of the electric motor 4 is stopped, the discharge displacement of the electric compressor 3 is reduced to substantially zero, and the electric compressor 3 enters substantially the state of rest. The calculation of the target rotational speed fn will be described later.

To the output side of the air conditioning control unit 20, the servo motors 13a, 14a, 17a, and 19 each constituting an electric drive means for each device, the inverter 6, which is a motor drive unit of the electric compressor 3, etc., are connected and the operation of these devices are controlled by the output signals from the air conditioning control unit 20.

Figure 3:
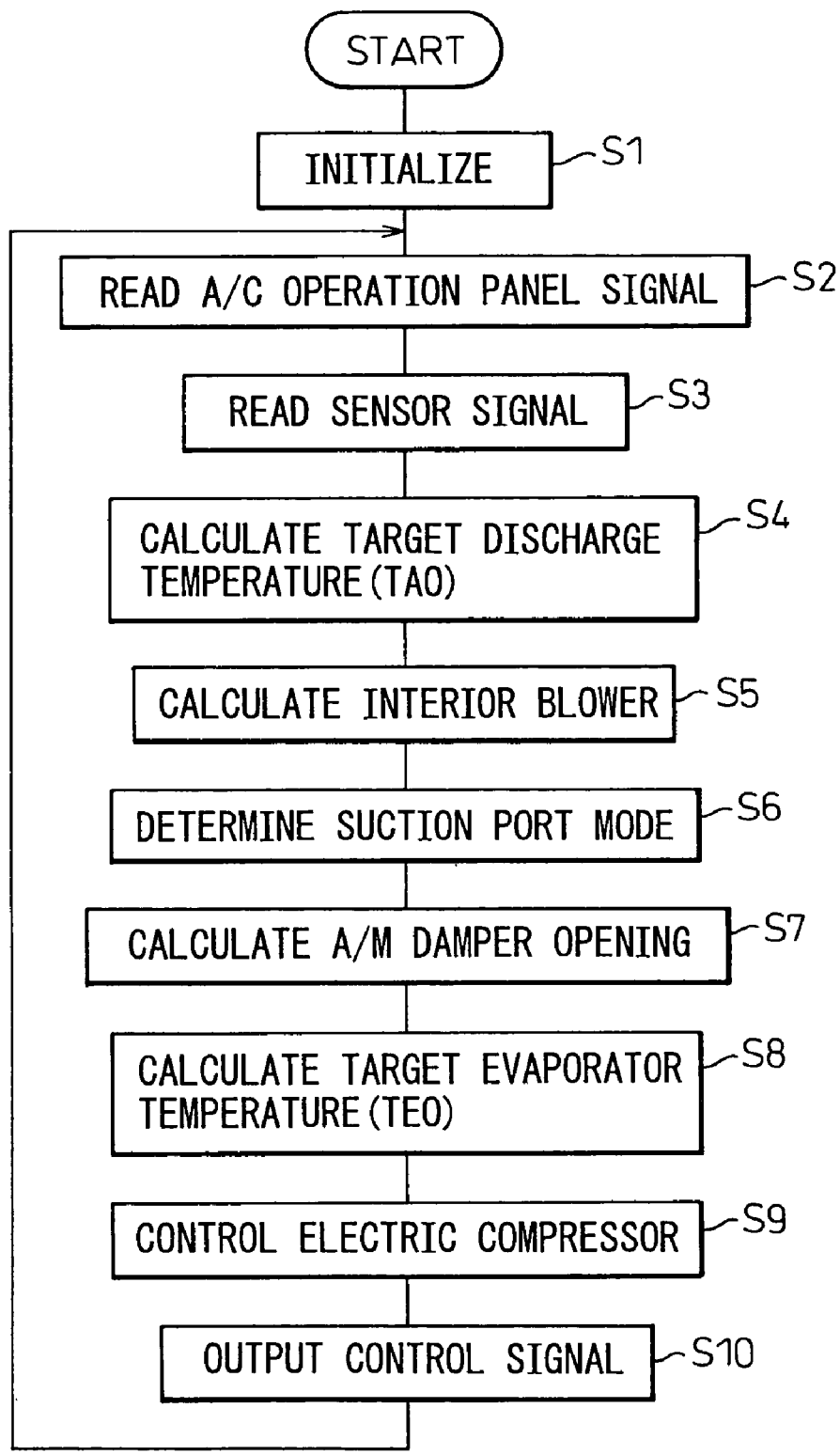
FIG. 3 is a flow chart showing a main routine executed by an air conditioning control unit in the embodiments.

Next, the operation in the present embodiment in the above-mentioned configuration is explained below. FIG. 3 is a flow chart showing a main routine executed by the air conditioning control unit 20. The control routine starts at the same time when the ignition switch of a vehicle is turned on.

In step S1, the flag, timer, etc., are initialized and in the next step S2, operation signals of the operation switches 21a to 21e of the air conditioning panel 21, etc., are read. In the next step S3, detection signals of the state of vehicle condition from the sensors 22a to 2f, etc., are read.

Next, in step S4, a target discharge temperature TAO of the conditioned air to be discharged into a vehicle compartment is calculated. The target discharge temperature TAO is a discharge temperature necessary to maintain the vehicle compartment at the set temperature Tset by the temperature setting switch 21a, and is the basic target value of the air conditioning control. The target discharge temperature TAO is calculated by the following well-known mathematical expression (1) based on the set temperature Tset set by the temperature setting switch 21a of the air conditioning operation panel 21, and factors in relation to the air conditioning heat load, such as the inside air temperature Tr, the outside air temperature Tam, and the quantity of solar radiation Ts.

$$TAO = Kset \times Tset - Kr \times Tr - Kam \times Tam - Ks \times Ts + C \quad (1)$$

In the expression, Kset, Kr, Kam, and Ks are control gains and C is a constant for correction.

Next, in step S5, the blower voltage to be applied to the blower motor 14a of the interior blower 14 is calculated based on the above-mentioned target discharged-air temperature TAO as shown in FIG. 4(a). Using this blower voltage, the rotational speed of the blower motor 14a, that is, the flow rate of the air discharged into a vehicle compartment can be determined so that the flow rate is high in the low-temperature region and high-temperature region of the target discharge temperature TAO and is low in the intermediate-temperature region thereof.

Next, in step 6, the suction port mode of the inside/outside air (the position of the inside/outside switching damper) is determined based on the target discharged-air temperature TAO and as shown in FIG. 4(b). Next, in step 7, the discharge port mode (the position of the discharge port damper) is determined based on the target discharged-air temperature TAO and as shown in FIG. 4(c). The FACE mode in FIG. 4(c) is a mode in which conditioned air is discharged from the face discharge outlet 182, the B/L (bilevel) mode is a mode in which conditioned air is discharged from the face discharge outlet 182 and the foot discharge outlet 183, and the FOOT mode is a mode in which conditioned air is discharged from the foot discharge outlet 183. A conditioned air may be discharged at low flow rate from the defroster discharge outlet 181 in the FOOT mode.

Next, in step 7, a target opening (degree) SW of the air mix damper 17 is calculated, which adjusts the temperature of the conditioned air to be discharged into a vehicle compartment to the target discharged-air temperature TAO. Specifically, the target air mix damper opening (degree) SW is calculated by the following mathematical expression (2) based on the discharged-air temperature Te of the evaporator 11 (the temperature detected by the evaporator discharge temperature sensor 22e), the hot water temperature Tw of the heater core 15 (the temperature detected by the water temperature sensor 22a), and the target discharged-air temperature TAO.

$$SW=\{(TAO-Te)/(Tw-Te)\} \times 100(\%) \qquad (2)$$

Next, in step S8, a target evaporator temperature TEO of the evaporator 11 is calculated. The target evaporator temperature TEO is determined to be either of a first target evaporator temperature TEO1 determined based on the target discharged-air temperature TAO and as shown in FIG. 4(d) or a second target evaporator temperature TEO2 determined based on the outside air temperature Tam and as shown in FIG. 4(e).

In other words, the first target evaporator temperature TEO1 is specifically determined so as to rise as the target discharge temperature TAO rises. When the outside air temperature Tam exceeds the intermediate temperature region (for example, around 20° C.), the need for dehumidification, for ensuring the ability to defrost the windshield is reduced and, therefore, the second target evaporator temperature TEO2 is raised to reduce the drive power of the electric compressor 3, and thus the drive power of the vehicle engine can be saved. On the other hand, at the low-temperature region, at which the outside air temperature Tam is below the intermediate temperature region, the second target evaporator temperature TEO2 is lowered to ensure the ability to defrost the windshield by the dehumidification effect of the evaporator 11.

Next, in step S9, the control value of the electric compressor 3 is calculated. The details of step S9 are described later. In the next step S10, the control values are output to the respective devices to be controlled and drive the devices.

Figure 5:
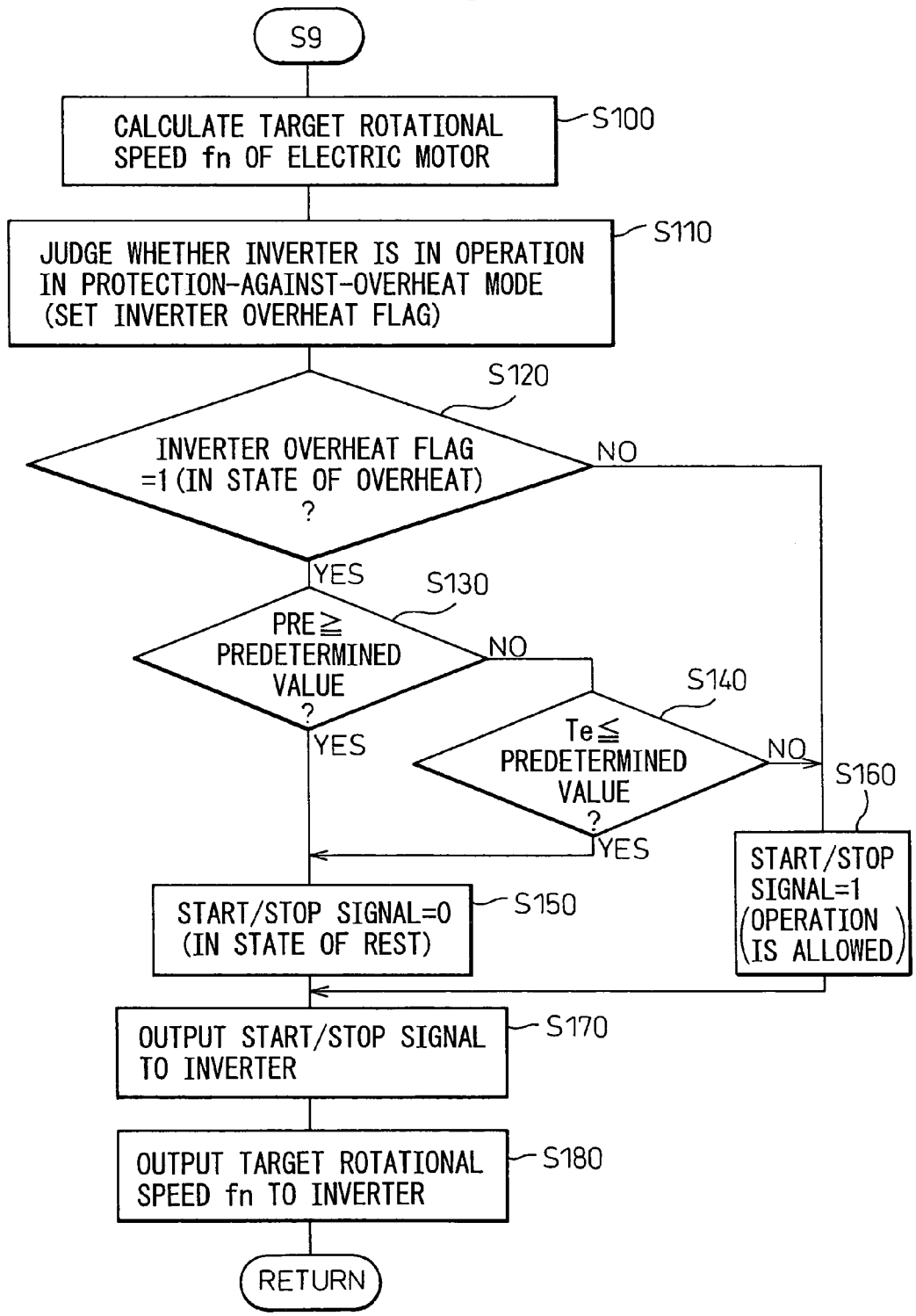
FIG. 5 is a flow chart showing a general control routine of an electric compressor in the embodiments.
Figure 6:
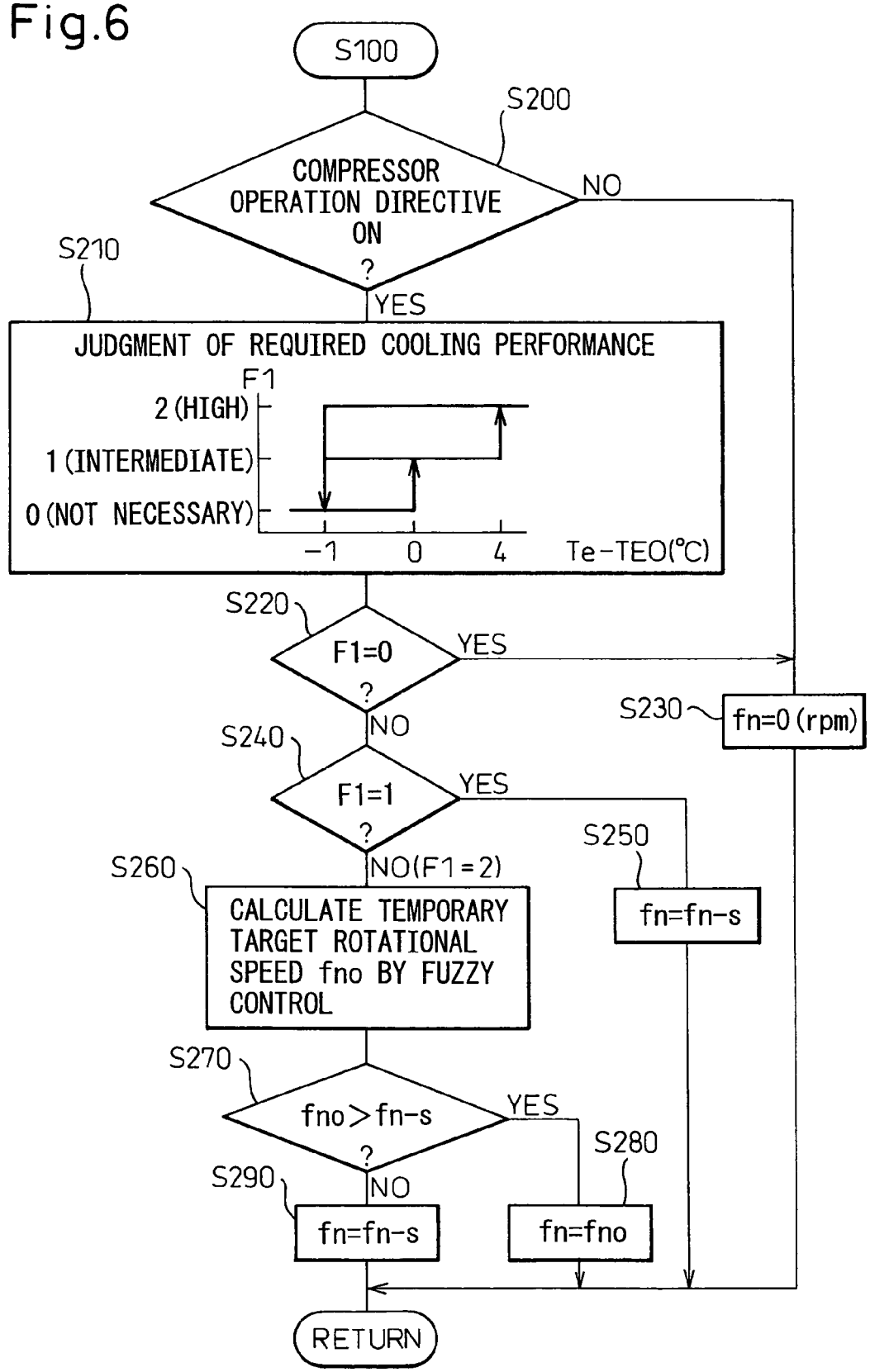
FIG. 6 is a flow chart showing an calculation routine for calculating a target rotational speed of the electric compressor.

FIG. 5 shows the detail of the control of the electric compressor in step S9 and in step S100, the target rotational speed fn of the electric motor 4 in the electric compressor 3 is calculated first. Here, the calculation method of the target rotational speed fn is explained below based on the operation routine shown in FIG. 6.

In step S200, whether the electric compressor operation directive is in the ON state is judged. This judgment is made based on the ON/OFF state of the air conditioning switch 21e, which serves as the compressor operation switch of the air conditioning operation panel 21. When the air conditioning switch 21e is OFF, the electric compressor operation directive is in the OFF state and in this case, the flow chart advances to step S230, in which the target rotational speed fn of the electric motor 4 is set to zero (rpm), that is, the electric compressor 3 is brought into the state of rest.

When the compressor operation directive is in the ON state, in the next step S210, a required cooling performance F1 is judged. In the present embodiment, this judgment is made based on the deviation (Te−TEO) between the actual evaporator discharge temperature Te detected by the evaporator discharge temperature sensor 22e and the target evaporator temperature TEO calculated in step S8 as described above.

That is, when the deviation (Te−TEO) is equal to or greater than 4° C., the required cooling performance F1 is set to 2, that is, F1=2. Here, F1=2 means that the required cooling performance is high. Once F1 is set to 2, the state is maintained until the actual evaporator discharge temperature Te falls below the target evaporator temperature TEO and the deviation (Te−TEO) is −1° C. Then, when the deviation (Te−TEO) is equal to or greater than 0° C., the required cooling performance F1 is set to 1, that is, F1=1. Here, F1=1 means that the required cooling performance is intermediate. The required cooling performance F1=1 is maintained in the range of the deviation (Te−TEO) less than 4° C. and greater than −1° C.

As described above, the state in which the required cooling performance F1=2 and the state in which the required cooling performance F1=1 are maintained in the respective predetermined deviation ranges in order to prevent hunting in the control of the rotational speed of the electric motor 4 and stabilize the control of the rotational speed of the electric motor 4. When the deviation (Te−TEO) is equal to or less than −1° C., the required cooling performance F1 is set to zero, that is F1=0. F1=0 means that the cooling performance is not necessary.

In the next step S220, whether the required cooling performance F1=0 is judged, and when F1=0, the flow chart advances to step S230, in which the target rotational speed fn of the electric motor 4 is set to 0 rpm, that is, fn=0 rpm, and the electric compressor 3 is brought in to a state of rest.

When F1 is not zero, the flow chart advances to step S240, in which whether F1=1 is judged. F1=1 means that the required cooling performance is "intermediate" and, therefore, when F1=1, the flow chart advances to step S250, in which the target rotational speed fn of the electric motor 4 is set to a predetermined intermediate rotational speed fn-s, to be specific, fn is set to 1,500 rpm. The predetermined intermediate rotational speed fn-s (1,500 rpm) is a rotational speed in a predetermined intermediate region with respect to the maximum rotational speed (for example, 7,500 rpm) of the electric motor 4.

When the result of the judgment in step S240 is NO, F1=2, that is, the required cooling performance is high and, therefore, in step S260, a temporary target rotational speed fno, in accordance with the required cooling performance, is calculated. The calculation method of the temporary target rotational speed fno in step S260 may be the known calculation method by the fuzzy control disclosed in Japanese Unexamined Patent Publication (Kokai) No. 8-2236, etc.

The outline of the calculation method by fuzzy control is explained below. The deviation (Te−TEO) between the actual evaporator discharge temperature Te and the target evaporator temperature TEO is calculated and, at the same time, the rate of change of the deviation (Te−TEO) is calculated and the increment or decrement Δfn of the target rotational speed required to reduce the deviation is calculated by fuzzy control based on the deviation (Te−TEO) and the rate of change of the deviation. Then, the temporary target rotational speed fno is calculated by summing the increment or decrement Δfn of the target rotational speed and the previously calculated rotational speed fn, that is, (fn+Δfn).

Next, in step S270, whether the temporary rotational speed fno is greater than the predetermined intermediate rotational speed fn-s (1,500 rpm) is judged. Normally, the result of the judgment in step 270 is YES and in the next step S280, the target rotational speed fn is set to fno, that is, fn=fno. In other words, the temporary target rotational speed fno calculated in step S260 is set to the target rotational speed fn as it is.

In contrast to this, when the result of the judgment in step S270 is NO, in the next step S290, the target rotational speed fn is set to fn-s, that is, fn=fn-s (1,500 rpm). In other words, the target rotational speed fn is fixed to the predetermined intermediate rotational speed fn-s (1,500 rpm).

As described above, by carrying out the control of the rotational speed of the electric compressor 3 by determining the target rotational speed fn of the electric motor 4 (the electric compressor 3), when the required cooling performance is "intermediate", the rotational speed of the electric compressor 3 is set to the predetermined intermediate rotational speed fn-s (1,500 rpm) (S250). Even when the rotational speed of the electric compressor 3 is the predetermined intermediate rotational speed fn-s, if the cooling heat load is small, the evaporator discharge temperature Te falls below the target evaporator temperature TEO and F1=0, and the rotational speed of the electric compressor 3 is set to zero (S230).

Therefore, when the required cooling performance is at the "high" level, based on the deviation (Te−TEO) between the actual evaporator discharge temperature Te and the target evaporator temperature TEO, the temporary target rotational speed fno for reducing the deviation is calculated and when the temporary target rotational speed fno is higher than the predetermined rotational speed fn-s, the electric compressor 3 is operated at the temporary rotational speed fno as the target rotational speed fn. Due to this, when the required cooling performance is at the "high" level, the flow rate of the refrigerant circulating in the cycle required for ensuring the air-conditioning performance can be ensured. When the cooling heat load is small, the rotational speed of the electric compressor 3 varies intermittently between the predetermined intermediate rotational speed fn-s and zero.

As described above, in the present embodiment, the target rotational speed fn of the electric motor 4 is given to the inverter 6 as a rotational speed specifying value that continuously varies from zero (at rest) to the maximum rotational speed.

Figure 7:
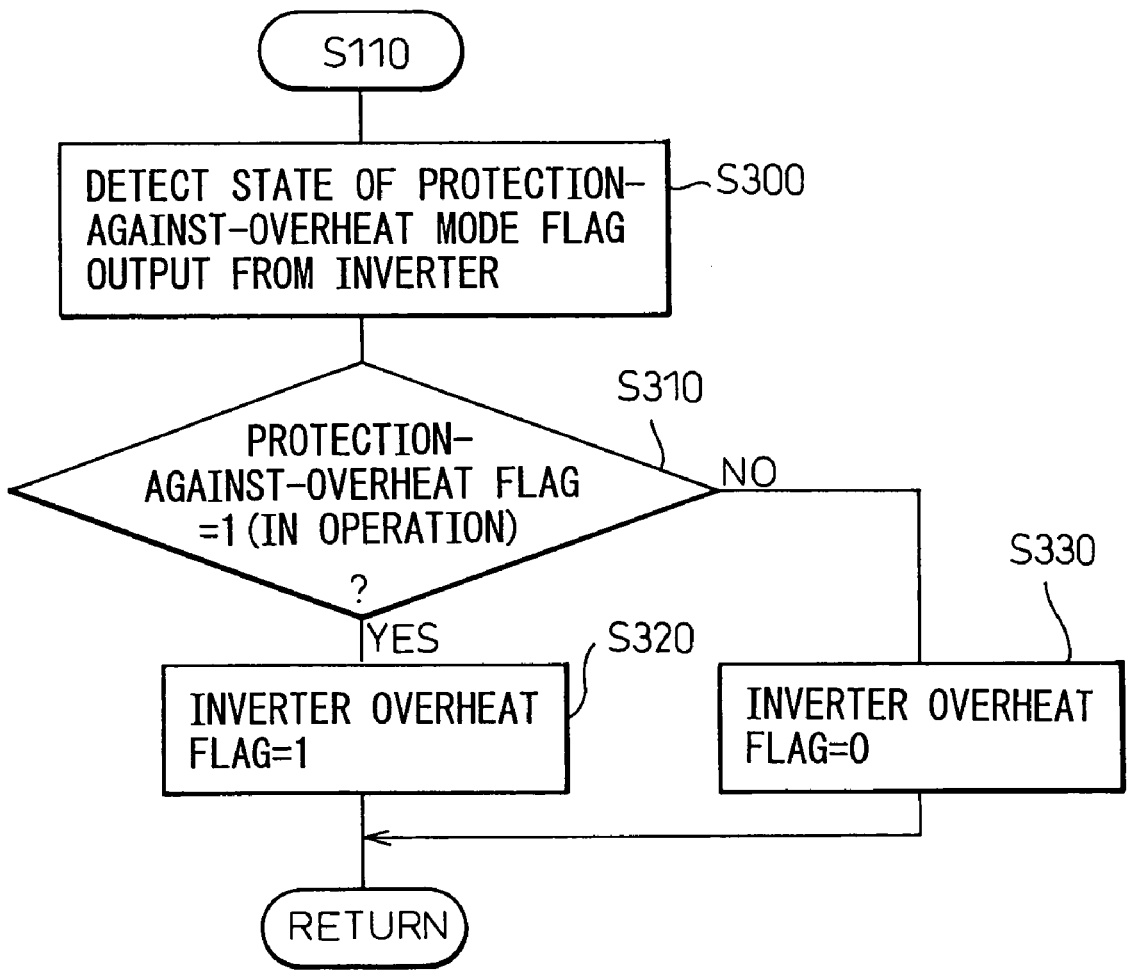
FIG. 7 is a flow chart showing a judgment routine for judging whether a motor drive unit (inverter) is in operation in a protection-against-overheat mode in an air conditioning unit of a first embodiment.

As described above, after the target rotational speed fn of the electric motor 4 is calculated in step S100 shown in FIG. 5, the flow chart advances to step S110, in which an inverter overheat flag is set up in the air conditioning control unit 20 by the processing routine shown in FIG. 7 in order to judge whether the inverter 6 is in operation in the protection-against-overheat mode.

In the protection-against-overheat mode, as will be described later, the inverter 6 forcedly drives the electric compressor 3 at the rotational speed for protection against heat set by the inverter 6 itself instead of driving the electric compressor 3 at a rotational speed specifying value in accordance with the target rotational speed from the air conditioning control unit 20, in order to protect the inverter 6 itself against overheat.

In FIG. 7, the state of the protection-against-overheat mode flag output from the inverter 6 is detected in step S300. In step S310, when the protection-against-overheat mode flag=1, that is, the inverter 6 is judged to be in operation in the protection-against-overheat mode, the air conditioning control unit 20 sets the inverter overheat flag to 1 in step S320. In step S310, when the protection-against-overheat mode flag=0, that is, the inverter 6 is judged to be not in operation in the protection-against-overheat mode, the air conditioning control unit 20 sets the inverter overheat flag to zero in step S330.

Next, in step S120 shown in FIG. 5, whether the set inverter overheat flag is 1 is judged. When the inverter overheat flag=1, that is, the inverter 6 is in operation in the protection-against-overheat mode, whether a refrigerant pressure PRE at the high pressure side detected by the pressure sensor 22f is equal to or greater than a predetermined value is judged in step S130. The predetermined value is set in advance in accordance with the maximum allowable withstanding pressure of the refrigerant pipe. When the refrigerant pressure PRE is equal to or greater than the predetermined value, the flow chart advances to step S150, in which the start/stop signal is set to "0", that is, a signal to direct the inverter 6 to forcedly stop the electric motor 4 is set.

In step S130, when the refrigerant pressure PRE is judged to be less than the predetermined value, whether the evaporator discharge temperature Te detected by the evaporator discharge temperature sensor 22e is equal to or greater than a predetermined value is judged in step S140. The predetermined value is set to a temperature (for example, 0 to 3° C.) at which the evaporator may freeze. When the evaporator discharge temperature Te is equal to or less than the predetermined value, the start/stop signal is set to zero and the electric compressor 3 is forcedly stopped in step S150.

When the inverter 6 is judged to be not in operation in the protection-against-overheat mode in step S120, or when the refrigerant pressure PRE is less than the predetermined value (S130) and the evaporator discharge temperature Te is greater than the predetermined value (S140), the start/stop signal is set to 1, in step S160 and the electric compressor 3 is not stopped forcedly, that is, the operation of the electric compressor 3 by the inverter 6 is permitted.

Then, in step S170, the start/stop signal set in step S150 or S160 is output to the inverter 6 and further in step S180, a rotational speed specifying value corresponding to the target rotational speed fn calculated in step S100 is output, and the flow chart returns to step S10 in the main routine (FIG. 3).

Figure 8:
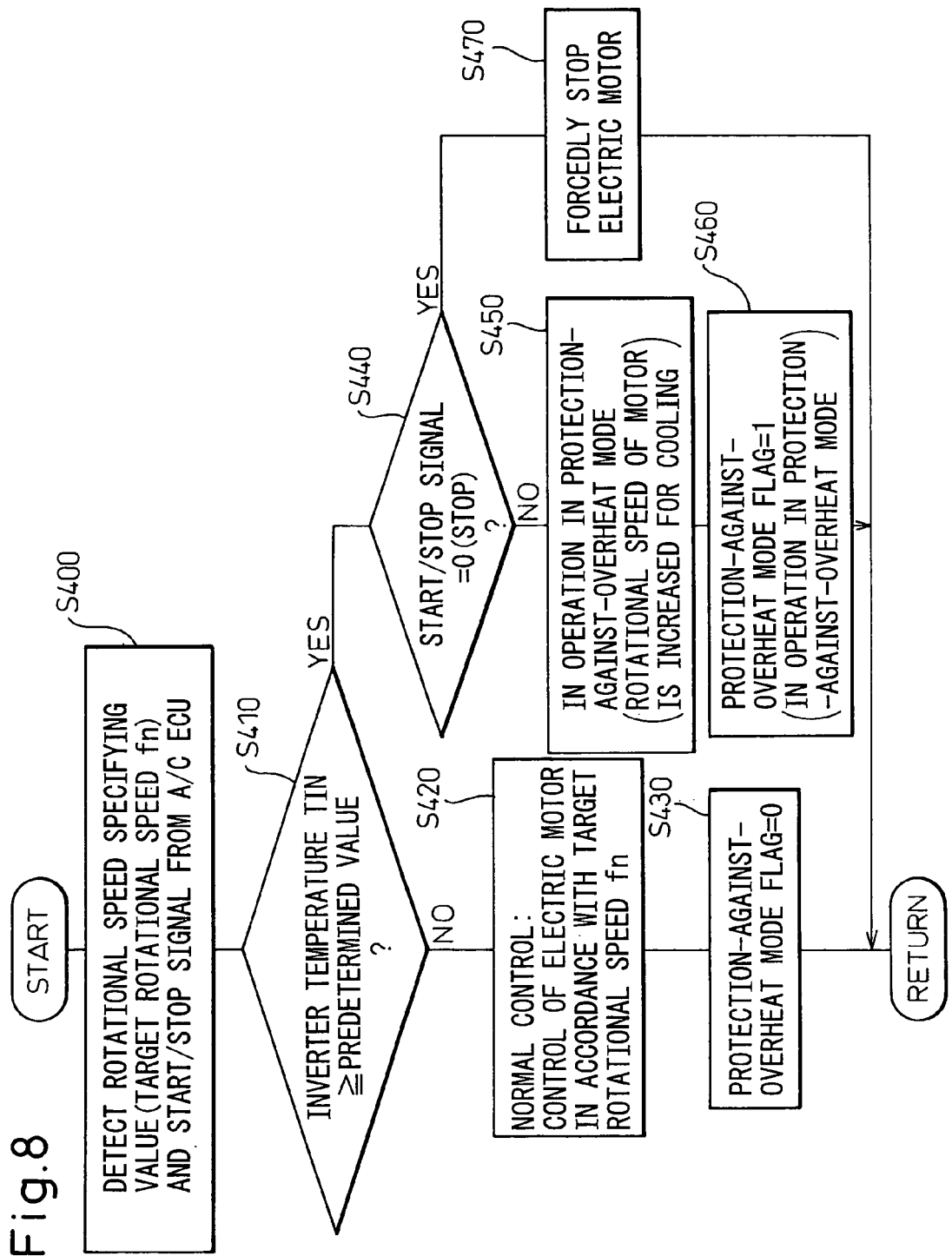
FIG. 8 is a flow chart showing a control routine in the motor drive unit (inverter) in the first embodiment.

Next, the operation in the inverter 6 is explained with reference to FIG. 8. The inverter 6 comprises a well-known microcomputer including CPU, ROM, RAM, etc., and peripheral circuits. FIG. 8 is a flow chart showing the control routine of the control programs stored in the ROM of the inverter 6, and the control routine is started when a vehicle is ignited.

First, in step S400, after initialization (not shown), the rotational speed specifying value (the target rotational speed fn) and the start/stop signal ("0" or "1") from the air conditioning control unit 20 are detected. The rotational speed specifying value (the target rotational speed fn) is calculated in the above-mentioned step S100, or in detail, in the calculation (operation) routine shown in FIG. 6.

Next, in step S410, in order to judge whether the inverter 6 itself should operate in the protection-against-overheat mode, whether the temperature TIN in the vicinity of the circuit board of the inverter 6 detected by the inverter temperature sensor 22g is equal to or greater than a predetermined value is judged. The predetermined value is set in accordance with a withstandable heat temperature of the semiconductor circuit of the inverter 6.

When the inverter temperature TIN is not greater than the predetermined value, that is, the temperature TIN is relatively low, it is judged that the operation in the protection-against-overheat mode of the inverter 6 is not necessary and the inverter 6 drives and controls the electric motor 4 in accordance with the rotational speed specifying value (the target rotational speed fn) from the air conditioning control unit 20 in step S420. This is the normal operation state of the electric compressor 3 during the air conditioning control. Then, in step S430, the protection-against-overheat mode flag is set to zero and is transmitted to the air conditioning control unit 20.

In step S410, when the inverter temperature TIN is equal to or greater than the predetermined value and the inverter 6 is judged to be in the state of overheat, the flow chart advances to step S440.

In step S440, based on the start/stop signal transmitted from the air conditioning control unit 20, whether it is necessary to prevent the function of refrigerating cycle 2 from being lost is judged. In other words, when the start/stop signal is not zero (that is, the start/stop signal=1), the protection of the refrigerating cycle 2 is judged to be not necessary in the air conditioning control unit 20 and, therefore, the flow chart advances to step S450, in which the operation is performed in the protection-against-overheat mode.

In other words, in the protection-against-overheat mode, the inverter 6 rotates and drives the electric motor 4 at a rotational speed of fn+α, which is an increased rotational speed for protection against overheat with respect to the rotational speed specifying value from the air conditioning control unit 20, when the rotational speed specifying value (the target rotational speed fn)≠0. The predetermined value α corresponds to the increase in rotational speed, which is enough to cool the inverter 6 which is in a state of overheat, and is set in advance.

On the other hand, when the rotational speed specifying value from the air conditioning control unit 20=0, that is, when the electric compressor 3 is in the state of rest, the inverter 6 rotates the electric motor 4 at the rotational speed for protection against heat set in advance as a fixed value (corresponding to an increase in rotational speed from the state of rest). The rotational speed for protection against heat is a predetermined rotational speed required to cool the inverter 6 in the state of overheat.

As described above, in the protection-against-overheat mode, instead of rotating the electric motor 4 at the rotational speed specifying value (the target rotational speed fn) as it is from the air conditioning control unit 20 or stopping the electric motor 4 in accordance with the rotational speed specifying value being zero, the inverter 6 itself sets a rotational speed for protection against heat at which the inverter 6 can be cooled by the refrigerant in order to cool the inverter 6 itself by rotating and driving the electric motor 4 at this rotational speed for protection against heat and by making the electric compressor 3 discharge the refrigerant after sucking and compressing the refrigerant.

As described above, when the protection-against-overheat mode is entered, the protection-against-overheat mode flag is set to 1, and is transmitted to the air conditioning control unit 20, in step S460.

On the other hand, in step S440, when the start/stop signal=0, the air conditioning control unit 20 judges that if the electric compressor 3 continues to suck, compress, and discharge the refrigerant, there is the possibility that the refrigerating cycle may function no longer because the refrigerant pressure PRE has exceeded the predetermined value in step S160 in FIG. 5 or the evaporator discharge temperature Te has fallen below the predetermined value, and forcedly stops the electric motor 4 in step S470 regardless of the protection-against-overheat mode of the inverter (the inverter 6 is in operation of self-cooling).

The inverter 6 executes the above-mentioned control routine repeatedly.

In the first embodiment, the air conditioning control unit 20 monitors the operation state of the inverter 6 by means of the protection-against-overheat mode flag, and when the protection-against-overheat mode flag=0, judges that the inverter is not in the state of overheat and outputs the rotational speed specifying value corresponding to the target rotational speed of the electric motor 4 to the inverter 6 and at the same time, outputs the start/stop signal which has been set to "1", to the inverter 6, in order to prevent the inverter 6 from being brought to an emergency stop. Due to this, it is possible for the inverter 6 to continue the normal air conditioning control operation.

Moreover, even when the protection-against-overheat mode flag from the inverter 6 is 1, that is, the inverter 6 is in operation in the protection-against-overheat mode in order to cool itself, in which the electric motor 4 is driven at a rotational speed for protection against heat, that is, a rotational speed for cooling set by the inverter 6 itself, the air conditioning control unit 20 judges that the protection of the refrigerant cycle 2 is not necessary if the refrigerant pressure PRE is less than the predetermined value and the evaporator discharge temperature Te is greater than the predetermined value, and outputs the start/stop signal, which has been set to 1, to the inverter 6. Due to this, it is possible for the inverter 6 to continue the operation in the protection-against-overheat mode and is protected against heat by self-cooling.

On the other hand, when the protection-against-overheat mode flag from the inverter 6 is 1, the air conditioning control unit 20 judges that the protection of the refrigerant cycle 2 is necessary if the refrigerant pressure PRE is equal to or greater than the predetermined value and/or the evaporator discharge temperature Te is equal to or less than the predetermined value, and outputs the start/stop signal to the inverter 6, which has been set to zero. Due to this, it is possible for the inverter 6 to stop the operation in the protection-against-overheat mode and forcedly stop the electric motor 4 by the directive (that is, the start/stop signal) different from the normal rotation directive, and thus the refrigerant pressure can be prevented from increasing by setting the flow rate of the refrigerant in the refrigerating cycle 2 to zero and the evaporator discharge temperature can be prevented from falling, and as a result, the function of the refrigerating cycle 2 can be prevented from being lost.

In conclusion, as described above, in the present embodiment, even in the case where the electric compressor 3 is in the state of rest (the target rotational speed fn of the electric motor 4=0), when the inverter temperature TIN exceeds the predetermined value, the operation in the protection-against-overheat mode can be performed and the inverter 6 can be protected against overheat.

While the electric compressor 3 is in operation in the protection-against-overheat mode, if the refrigerant pressure increases excessively or the temperature of the evaporator falls to a point at which frost may appear, and there arises the possibility that the function of the refrigerating cycle may be lost because of the increase in refrigerant pressure or the freezing of the evaporator, the protection-against-overheat mode is forcedly stopped to prevent the abnormal pressure and the occurrence of frost and thus the refrigerating cycle can be protected. Such an increase in refrigerant pressure is likely to occur when an attempt is made to further increase the flow rate of the refrigerant in the refrigerating cycle when, for example, the air conditioner is in the state of rest and the amount of heat exchanged with the air in the condenser in the refrigerating cycle is extremely small. Moreover, such a drop in temperature of the evaporator is like to occur when the refrigerant continues to flow when, for example, the air conditioner is in the state of rest, the air does not flow in the evaporator, and the amount of heat exchanged with the air in the evaporator is extremely small.

Therefore, as in the present embodiment, when the operation in the protection-against-overheat mode is performed in order to avoid the state of overheat of the inverter 6 when the electric compressor 3 is in the state of rest, as the possibility that the function of the refrigerating cycle is lost because of the protection-against-overheat mode increases, the forced stop of the protection-against-overheat mode in the present embodiment is effective in particular from the standpoint of the protection of the refrigerating cycle.

Second Embodiment

In the first embodiment described above, the air conditioning control unit 20 judges whether the inverter 6 is in operation in the protection-against-overheat mode by detecting the protection-against-overheat mode flag output from the inverter 6, but in a second embodiment, the inverter 6 outputs the temperature TIN detected by the inverter temperature sensor 22g to the air conditioning control unit 20 and the air conditioning control unit 20 judges the operation state of the inverter 6 based on the inverter temperature TIN from the inverter 6.

Figure 9:
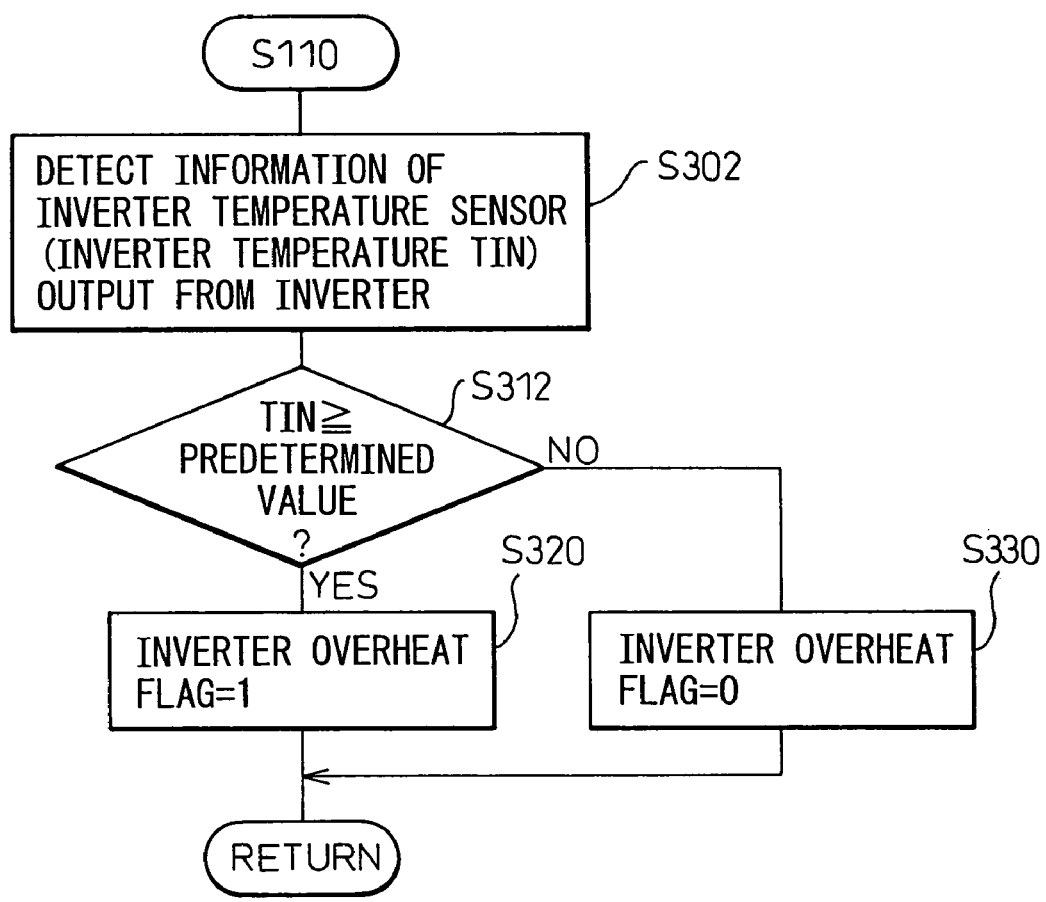
FIG. 9 is a flow chart showing a judgment routine for judging whether a motor drive unit (inverter) is operating in a protection-against-overheat mode in an air conditioning unit in a second embodiment.
Figure 10:
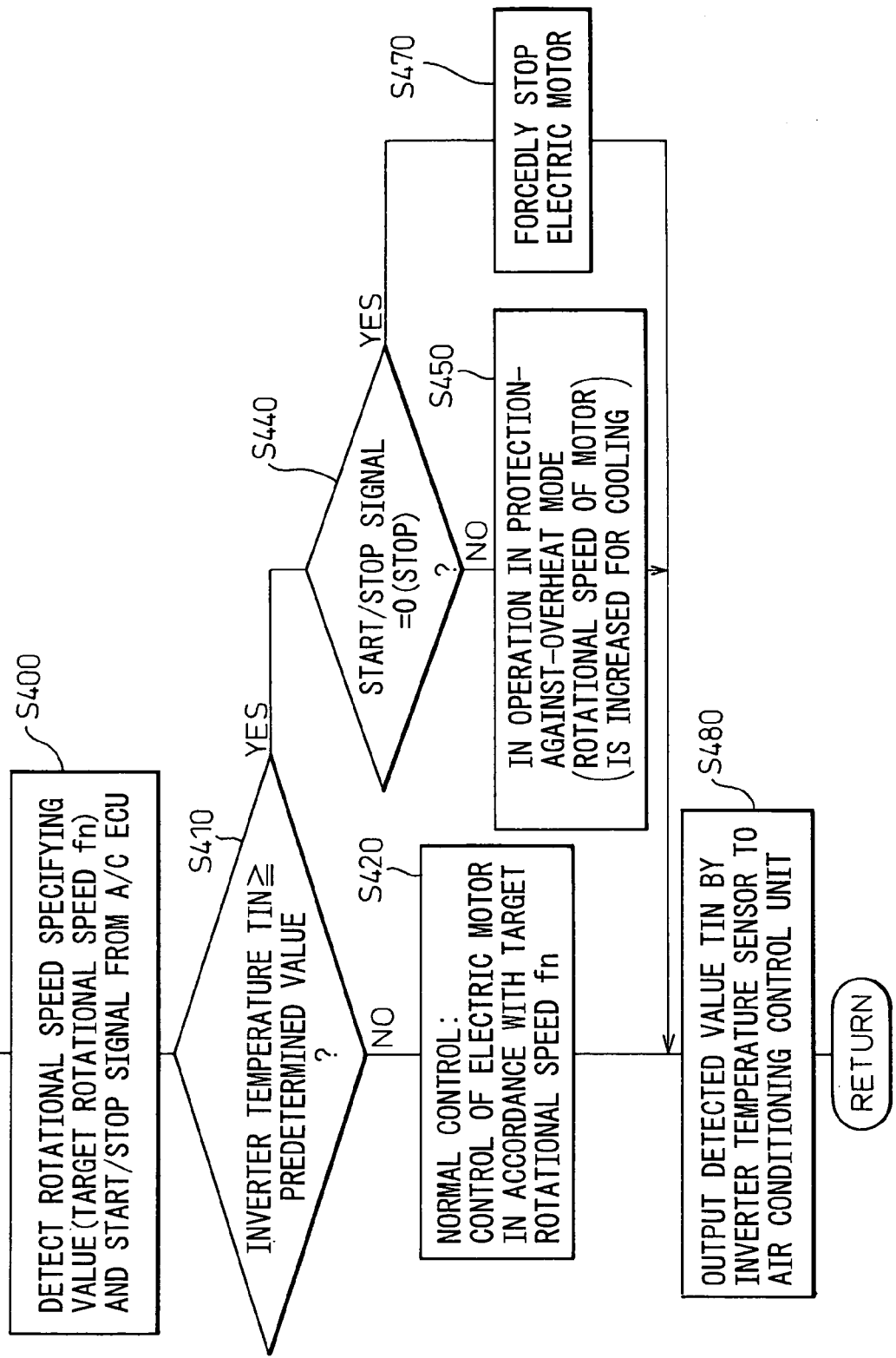
FIG. 10 is a flow chart showing a control routine in the motor drive unit (inverter) in the second embodiment.

FIG. 9 shows an operation judgment routine of the inverter 6 in the air conditioning control unit 20 in the second embodiment and FIG. 10 shows a control routine by the inverter 6 in the second embodiment. The same symbols are attached to the same processes as those in the operation judgment routine (FIG. 7) and the control routine (FIG. 8) in the first embodiment and a description is not given here. Moreover, the main routine (FIG. 3) in the air conditioning control unit 20, the processing routine (FIG. 5) in step S9, and the target rotational speed calculation routine (FIG. 6) are the same as those in the first embodiment, therefore, a description is not given here.

In step S302, the air conditioning control unit 20 is input the inverter temperature TIN detected by the inverter temperature sensor 22g from the inverter 6. In the next step S312, whether the inverter temperature TIN is equal to or greater than a predetermined value is judged. The predetermined value may be the same value as the predetermined value used when whether the inverter 6 is in the state of overheat (S410 in FIG. 8) is judged.

When the inverter temperature TIN is equal to or greater than the predetermined value, the flow chart advances to step S320 and, as in the first embodiment, the inverter overheat flag is set to 1. When the inverter temperature TIN is less than the predetermined value, the flow chart advances to step S330 and as in the first embodiment, the inverter overheat flag is set to zero.

On the other hand, in the control routine in the inverter 6 (FIG. 10), it is not necessary to transmit the protection-against-overheat mode flag to the air conditioning control unit 20, while it is necessary to do so in the first embodiment and, therefore, steps S430 and S460 in the processing routine in the first embodiment shown in FIG. 8 can be skipped and, in step S480, the inverter temperature TIN detected by the inverter temperature sensor 22g is output to the air conditioning control unit 20.

In the second embodiment also, the same effect as that in the first embodiment can be obtained.

Other Embodiments (1) In the first and second embodiments described above, the refrigerant pressure is detected by the pressure sensor 22f and the air conditioning control unit 20 judges whether the protection-against-overheat mode should be stopped, based on the magnitude of the detected pressure PRE, but the method is not limited to these methods. That is, instead of the pressure sensor 22f, a high-pressure switch that outputs a signal when the refrigerant pressure exceeds a preset pressure may be used.

(2) In the first and second embodiments described above, the inverter, which is a motor drive unit of the electric compressor 3, and the air conditioning control unit (A/C ECU) 20 are directly connected as shown in FIG. 1 and signals are transmitted therebetween, but the configuration is not limited to these configurations. For example, the configuration shown in FIG. 11 may be possible.

Figure 11:
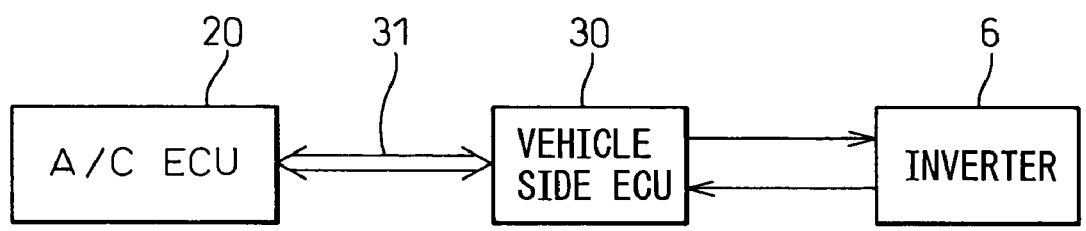
FIG. 11 is a diagram showing another embodiment.

That is, in the example shown in FIG. 11, the air conditioning control unit 20 is connected to an ECU 30 on the vehicle side for controlling the vehicle engine, automatic transmission (neither one is shown), etc., via an on-board LAN 31 and input/output signals of the air conditioning control unit 20 are transmitted and received to and from the on-board LAN 31. Then, the inverter 6 of the electric compressor 3 is connected only to the vehicle side ECU 30 and the rotational speed specifying value, the protection-against-overheat mode flag, and the start/stop signals are inputted to and output from the vehicle side ECU 30. At this time, it may be possible for the vehicle side ECU 30 to judge and output the start/stop signals to the inverter 6. Due to this, the forced stop of the electric compressor 3 is separated from the control routine in the air conditioning control unit 20 and the operation load, such as calculation load, on the air conditioning control unit 20 can be reduced.

(3) In the first and second embodiments described above, an example is explained in which the need of operation in the protection-against-overheat mode is judged by the inverter 6 and the inverter 6 drives the electric motor 4 independently at the rotational speed for protection against heat different from the rotational speed specifying value from the air conditioning control unit 20, but the examples are not limited to this. For example, the need of operation in the protection-against-overheat mode is judged by the air conditioning control unit 20 based on the inverter temperature TIN and the air conditioning control unit 20 switches between the rotational speed specifying value of the electric compressor 3 during the normal air conditioning operation and the rotational speed for protection against heat in the protection-against-overheat mode and outputs either one to the inverter 6 according to circumstances. However, as in each of the embodiments described above, the air conditioning control unit 20 outputs the start/stop signal to the inverter 6 separately from the rotational speed specifying vale and the rotational speed for protection against heat. When the start/stop signal=1, the inverter 6 drives the electric motor 4 in accordance with the rotational speed specifying value and the rotational speed for protection against heat transmitted from the air conditioning control unit 20, and when the start/stop signal=0, forcedly stops the electric motor 4 immediately regardless of the rotational speed specifying value and the rotational speed for protection against heat.

What is claimed is:

1. An air conditioner for a vehicle, comprising:
    an electric compressor having a compression mechanism for sucking and compressing a refrigerant, an electric motor for diving the compression mechanism, and a motor drive unit for controlling and driving the electric motor and being arranged so as to be cooled by the refrigerant, the electric compressor constituting a refrigerating cycle together with an evaporator for evaporating the refrigerant;
    evaporator discharge temperature detection means for detecting the temperature of the air having passed through the evaporator;

pressure detection means for detecting refrigerant pressure at a high pressure side in the refrigerating cycle; and an air conditioning control unit for issuing a rotational speed specifying value that specifies a rotational speed of the electric motor or directs the electric motor to stop, to the motor drive unit, wherein:

the electric motor operates in a protection-against-overheat mode for protecting the motor drive unit from being overheated, when the motor drive unit is in a state of overheat;

in the protection-against-overheat mode, the motor drive unit is cooled by the refrigerant by rotating the electric motor at a rotational frequency for protection against heat specified by the motor drive unit, separately from the rotational frequency specifying value, to drive the compression mechanism to suck and compress the refrigerant;

the air conditioning control unit judges whether the protection-against-overheat mode should be stopped during the operation in the protection-against-overheat mode and when the result of the judgment is that the mode should be stopped, the air conditioning control unit outputs a stop signal to the motor drive unit to stop the rotation of the electric motor rotating at the rotational speed for protection against heat;

when the stop signal is not output, the air conditioning control unit outputs a start signal to the motor drive unit and when the start signal is output from the air conditioning control unit, and the motor drive unit drives the electric motor in accordance with the rotational speed specifying value or in the protection-against-overheat mode;

the motor drive unit judges whether to operate in the protection-against-overheat mode and when result of the judgment is affirmative, the motor drive unit transmits a protection-against-overheat mode flag to the air conditioning control unit as well as driving the electric motor at the rotational speed for protection against heat regardless of the rotational speed specifying value from the air conditioning control unit;

when the protection-against-overheat mode flag is transmitted, the air conditioning control unit judges whether refrigerant pressure detected by the pressure detection means exceeds a predetermined value or whether the temperature detected by the evaporator discharge temperature detection means falls below a predetermined value;

when the protection-against-overheat mode flag is transmitted, if the air conditioning control unit judges that refrigerant pressure detected by the pressure detection means exceeds a predetermined value or that temperature detected by the evaporator discharge temperature detection means falls below a predetermined value, the air conditioning control unit judges that the protection-against-overheat mode should be stopped and outputs the stop signal;

when the protection-against-overheat mode flag is transmitted, if the air conditioning control unit judges that refrigerant pressure detected by the pressure detection means falls below a predetermined value and that temperature detected by the evaporator discharge temperature detection means exceeds a predetermined value, the air conditioning control unit judges that the protection-against-overheat mode should not be stopped and outputs the start signal; and when the protection-against-overheat mode flag is not transmitted, the air conditioning control unit does not judge whether refrigerant pressure detected by the pressure detection means exceeds a predetermined value and whether temperature detected by the evaporator discharge temperature detection means falls below a predetermined value and outputs the start signal.

2. The air conditioner for a vehicle as set forth in claim 1, further comprising a drive unit temperature detection means for detecting temperature of the motor drive unit, wherein a state of overheat of the motor drive unit is judged based on temperature detected by the drive unit temperature detection means.

3. The air conditioner for a vehicle as set forth in claim 2, wherein:

the motor drive unit judges whether to operate in the protection-against-overheat mode and when the result of the judgment is affirmative, the motor drive unit drives the electric motor at the rotational speed for protection against heat regardless of the rotational speed specifying value from the air conditioning control unit; and the air conditioning control unit judges whether to stop the protection-against-overheat mode as well as judging whether the motor drive unit operates in the protection-against-overheat mode based on the temperature detected by the drive unit temperature detection means.

4. The air conditioner for a vehicle as set forth in claim 1, wherein the protection-against-overheat mode is carried out when the motor drive unit enters the state of overheat with the electric compressor at rest.

5. The air conditioner for a vehicle as set forth in claim 4, wherein the rotational speed for protection against heat is a fixed value set in advance.

6. The air conditioner for a vehicle as set forth in claim 1, wherein:

the protection-against-overheat mode is carried out when the motor drive unit enters the state of overheat while the electric compressor is in operation in accordance with the rotational speed specifying value from the air conditioning control unit; and the rotational speed for protection against heat is set to a rotational speed higher than the rotational speed specifying value by a predetermined amount.

* * * * *